(12) United States Patent
Takeishi et al.

(10) Patent No.: US 6,490,956 B1
(45) Date of Patent: Dec. 10, 2002

(54) FEEDING APPARATUS OF MOVED BODY

(75) Inventors: Hideyuki Takeishi, La Mirada, CA (US); Gunter Becker, La Mirada, CA (US)

(73) Assignee: Amada MFG America Inc., La Mirada, CA (US)

( * ) Notice: Subject to any disclaimer, the term of this patent is extended or adjusted under 35 U.S.C. 154(b) by 86 days.

(21) Appl. No.: 09/664,830

(22) Filed: Sep. 19, 2000

(51) Int. Cl.[7] .................. B26D 7/06; B21D 43/11; F16H 3/06
(52) U.S. Cl. .................. 83/437.4; 83/409; 83/552; 74/89.23; 74/89.14
(58) Field of Search .................. 83/437.4, 435.11, 83/435.21, 552, 409, 409.1, 409.2, 412; 74/89.23, 89.14; 269/60, 58, 71, 73, 153

(56) References Cited

U.S. PATENT DOCUMENTS

| | | | | |
|---|---|---|---|---|
| 3,918,167 A | * | 11/1975 | Gerber ..................... | 269/73 X |
| 4,434,693 A | * | 3/1984 | Hosoi et al. .............. | 269/73 X |
| 4,449,416 A | * | 5/1984 | Huitema ................ | 74/89.14 X |
| 4,483,523 A | * | 11/1984 | Bredow ........................ | 269/60 |
| 4,682,930 A | * | 7/1987 | Hachisu ................. | 74/89.23 X |
| 4,896,869 A | * | 1/1990 | Takekoshi ..................... | 269/60 |
| 5,350,347 A | * | 9/1994 | Fujiwara et al. .......... | 83/552 X |
| 5,862,733 A | * | 1/1999 | Seto et al. ............. | 83/437.4 X |
| 6,125,731 A | | 10/2000 | Seto et al. ................. | 83/437.4 |
| 6,145,424 A | * | 11/2000 | Matsuda et al. ........ | 83/437.4 X |
| 6,189,375 B1 | * | 2/2001 | Tsuruta .................. | 74/89.23 X |

FOREIGN PATENT DOCUMENTS

DE     19821763     11/1998

* cited by examiner

Primary Examiner—Charles Goodman
(74) Attorney, Agent, or Firm—Greenblum & Bernstein, P.L.C.

(57) ABSTRACT

A feeding apparatus of a moved body includes: a base; a rotatable long ball screw extending in a longitudinal direction of the base; a nut member engaged with the long ball screw; a moved body mounted to the nut member; a pair of drive shafts arranged in parallel to the long ball screw and being provided with a ball screw; driving and transmitting members connecting both outer end portions of each of the drive shafts to both ends of the long ball screw; drive motors connected to both inner end portions of each of the drive shafts; and an intermediate support supporting the long ball screw and each of the drive shafts. The intermediate support is provided with a nut member which is engaged with the ball screw. Therefore, the intermediate support is moved in a longitudinal direction by rotation of the long ball screw.

19 Claims, 9 Drawing Sheets

FEEDING APPARATUS OF MOVED BODY

BACKGROUND OF THE INVENTION

1. Field of the Invention

The present invention relates to a feeding apparatus of a moved body which moves a moved body such as a carriage provided with a work clamp for clamping a workpiece in a sheet material working machine, for example, a turret punch press or the like.

2. Description of the Related Art

In a conventional turret punch press corresponding to a sheet material working machine, the turret punch press includes a feeding apparatus 101 corresponding to a moved body for moving a workpiece wherein a carriage base 103 extending in a lateral direction as shown in FIG. 1 is provided in such a manner as to move in a direction of a Y-axis (a vertical direction in FIG. 1). A nut member is provided in a lower portion in a substantially center portion of the carriage base 103, and a rotatable ball screw 105 extending in the direction of the Y-axis is provided in the nut member. One end of the ball screw 105, for example, a lower end in FIG. 1 is supported to a bearing 107, and another end of the ball screw 105, for example, an upper end in FIG. 1 is connected to an output shaft of a Y-axis servo motor 111 mounted to a motor base 109.

In the structure mentioned above, when driving the Y-axis servo motor 111, the ball screw 105 is rotated and the carriage base 103 is moved in the direction of the Y-axis via the nut member.

Further, a rotatable long ball screw 113 is extended along a direction of an X-axis of the carriage base 103, one end of the long ball screw 113, for example, a left end in FIG. 1 is supported to a bearing 115, and another end of the long ball screw 113, for example, a right end in FIG. 1 is connected to an output shaft of an X-axis servo motor 119 mounted to a motor base 117. In this case, the motor base 117 is mounted on the carriage base 103. A nut member 121 (121' in FIGS. 3 and 4) is engaged with the long ball screw 113, and a carriage 123 (123' in FIG. 3) is integrally provided in the nut member 121. A plurality of work clamps 125 for clamping a workpiece W are provided in the carriage 123.

In the structure mentioned above, when driving the X-axis servo motor 119, the long ball screw 113 is rotated and the carriage 123 is moved in the direction of the X-axis via the nut member 121, so that the workpiece W clamped by the work clamp 125 is moved in the direction of the X-axis. Accordingly, the workpiece W is moved in the direction of the X-axis and the direction of the Y-axis.

Further, a structure shown in FIG. 2 has been known as another feeding apparatus 127 which moves the workpiece. In FIG. 2, the same reference numerals are attached to the same elements as the elements in FIG. 1 and an overlapping description will be omitted. In FIG. 2, one end and another end of the long ball screw 113, for example, a left end and a right end in FIG. 2 are connected to output shafts of X-axis servo motors 133 and 135 mounted to motor bases 129 and 131. In this case, the motor bases 129 and 131 are mounted on the carriage base 103.

In the structure mentioned above, when driving the X-axis servo motors 133 and 135, the long ball screw 113 is rotated and the carriage 123 is moved in the direction of the X-axis via the nut member 121, so that the workpiece W clamped by the work clamp 125 is moved in the direction of the X-axis. Accordingly, the workpiece W is moved in the direction of the X-axis and the direction of the Y-axis.

Further, there is another turret punch press as shown in FIGS. 3 to 5. The turret punch press is partly described in a German Patent Application, Laid-Open No. DE 198 21 763 A1, Laid-Open on Nov. 19, 1998.

In FIGS. 3 and 4, the same reference numerals are attached to the same elements as the elements in FIG. 2 and an overlapping description will be omitted. In FIGS. 3 and 4, a long ball screw spline 139 is used in place of the long ball screw 113, and the output shafts of the X-axis servo motors 133 and 135 are connected to both ends of the long ball screw spline 139. Linear guides 141 and 143 are extended to right and left portions on the carriage base 103. A plurality of intermediate supports 145 are provided so as to move in a lateral direction by being guided along the linear guides 141 and 143. Further, each of the intermediate supports 145 supports the long ball screw spline 139 when the long ball screw spline 139 rotates and the nut member 121' moves in the lateral direction.

The intermediate support 145 is in detail shown in FIG. 5. In FIG. 5, the long ball screw spline 139 is constituted by a ball screw portion 139B and a spline portion 139S. Further, the intermediate support 145 is structured such that a first intermediate support main body 147 guided along the linear guide 141 or 143 and a second intermediate support main body 149 supporting the long ball screw spline 139 are integrally formed. A spline outer cylinder portion 151 and a ball screw nut portion 153 are provided within the second intermediate support main body 149 via support bearings 155 and 157. A width D of the intermediate support is between 250 mm and 300 mm.

The spline outer cylinder portion 151 is engaged with the spline portion 139S of the long ball screw spline 139 and the ball screw nut portion 153 is engaged with the ball screw portion 139B of the long ball screw spline 139. Further, for example, a pulley 159 is connected to the spline outer cylinder portion 151 by a bolt and for example, a pulley 161 is connected to the ball screw nut portion 153 by a bolt.

On the contrary, a rotatable shaft 163 is supported in a lateral direction corresponding to a longitudinal direction of the first intermediate support main body 147 and the other pulleys 165 and 167 are respectively attached to both ends of the shaft 163. Timing belts 169 and 171 are respectively wound between the pulleys 159 and 165 and between the pulleys 161 and 167.

In accordance with the structure mentioned above, when the long ball screw spline 139 is rotated as shown by an arrow in FIG. 5, the pulley 159 is rotated in the same direction as a rotational direction of the long ball screw spline 139 via the spline portion 139S. The rotation of the pulley 159 is transmitted to the shaft 163 via the timing belt 169 and the pulley 165 and the shaft 163 is rotated. Further, the rotation of the shaft 163 is transmitted to the pulley 161 via the pulley 167 and the timing belt 171 and the pulley 161 is rotated, so that the ball screw nut portion 153 is moved, for example, in a rightward direction in FIG. 5.

In FIG. 5 mentioned above, when setting a ratio between diameters of the pulleys 159 and 165 to 1:1 and setting a ratio between diameters of the pulleys 161 and 167 to 1:½, a moving amount of each of the intermediate supports 145 becomes a half of a moving amount of the carriage 123, whereby a moving operation is performed. In the drawing, reference symbol E denotes a mounting distance between the respective intermediate supports 145.

In this case, as shown in FIGS. 3 and 4, the structure is made such that the intermediate supports 145 are provided for a high speed and a stabilization of the system, however, as shown in FIG. 5, there is employed a method of assembling the intermediate support 145 on the long ball screw spline 139 as shown in FIG. 5. In this case, since it is necessary to provide the spline outer cylinder portion 151, the ball screw nut portion 153, the pulleys 159, 161, 165 and 167 and the timing belts 169 and 171 in the intermediate support 145 itself, there is a disadvantage that a width D of the intermediate support 145 is increased in view of the construction.

Since the width D, for example, between 250 mm and 300 mm does not affect on the long ball screw spline 139 in view of a space and becomes a wasteful dimension, it is necessary to lengthen the long ball screw spline 139 at the degree so as to secure an effective length, so that the distance E between the supports of the long ball screw spline 139 by the intermediate supports 145 becomes necessarily increased and it is impossible to increase a danger speed. Accordingly, there is a problem that it is impossible to make the speed of the shaft high.

Further, since it is necessary to increase the length of the carriage base 103 supporting the long ball screw spline 139 when the long ball screw spline 139 becomes long, a weight thereof is increased. Accordingly, in the case that a vibration is generated at a time of punching, for example, in a punch press, there is a problem that the vibration can not be reduced.

SUMMARY OF THE INVENTION

The present invention is made for solving the problems mentioned above, and an object of the present invention is to provide a feeding apparatus of a moved body in which a high speed structure can be obtained by making a width of an intermediate support not longer than a conventional one and making a length of a long ball screw not longer than a conventional one and a vibration generated at a time of punching, for example, in a punch press is reduced.

In order to achieve the object mentioned above, in accordance with a first aspect of the present invention, there is provided a feeding apparatus of a moved body, comprising: a base; bearings provided on the base at both ends of the base; a rotatable long ball screw extending in a longitudinal direction of the base, the long ball screw being supported by the bearings; a nut member engaged with the long ball screw; a moved body mounted to the nut member; a pair of drive shafts arranged in parallel to the long ball screw, the drive shafts provided with a ball screw; driving and transmitting members connecting both outer end portions of each of the drive shafts to both ends of the long ball screw; drive motors mounted on the base, each of the drive motor being connected to both inner end portions of each of the drive shafts; and an intermediate support supporting the long ball screw and each of the drive shafts, the intermediate support being provided with a nut member which is engaged with the ball screw provided on the drive shaft, the intermediate support being moved in a longitudinal direction of the long ball screw and each of the drive shafts by rotation of the drive shafts.

Accordingly, when driving each of the drive motors, each of the drive shafts is rotated and the long ball screw is rotated via each of the driving and transmitting member. The long ball screw is rotated, whereby the moved body is moved in the longitudinal direction of the long ball screw via the nut member. When the moved body is moved, the intermediate support supporting each of the drive shafts and the long ball screw also supports each of the drive shafts and the long ball screw while moving in the same direction as a moving direction of the moved body.

As a result, a high speed structure can be obtained by making a length of the long ball screw not longer than a conventional one and a vibration generated at a time of punching, for example, a punch press.

In accordance with a second aspect of the present invention, as it depends from the first aspect, there is provided a feeding apparatus of a moved body, in which the moved body is a carriage provided with a work clamp for clamping a workpiece.

Accordingly, since the moved body is the carriage provided with the work clamp for clamping the workpiece, the workpiece clamped by the work clamp is smoothly moved at a high speed.

In accordance with a third aspect of the present invention, as it depends from the first or the second aspect, there is provided a feeding apparatus of a moved body, in which a plain bearing slid by the long ball screw are provided in the intermediate support.

Accordingly, the ball screw corresponding to each of the drive shafts is rotated, whereby the nut member is rotated and the plain bearing is slid in the longitudinal direction of the long ball screw. Therefore, the intermediate support is smoothly moved in the longitudinal direction of the long ball screw at a high speed while always supporting the long ball screw.

As a result, it is possible to make the width of the intermediate support not longer than the conventional one and a supporting width of the long ball screw can be minimized.

In accordance with a fourth aspect of the present invention, as it depends from one aspect among the first aspect to the third aspect, there is provided a feeding apparatus of a moved body, in which the long ball screw is provided with a spline on an outer periphery in the longitudinal direction of the long ball screw; and the intermediate support is provided with a spline outer cylinder engaged with the spline provided in the long ball screw.

Accordingly, the ball screw corresponding to each of the drive shafts is rotated, whereby the nut member is rotated and the spline outer cylinder is slid in the longitudinal direction by the spline of the long ball screw. Therefore, the intermediate support is smoothly moved in the longitudinal direction of the long ball screw at a high speed while always supporting the long ball screw.

As a result, it is possible to make the width of the intermediate support not longer than the conventional one and a supporting width of the long ball screw can be minimized.

In accordance with a fifth aspect of the present invention, as it depends from one aspect among the first aspect to the fourth aspect, there is provided a feeding apparatus of a moved body, in which a ratio between a lead of the long ball screw and a lead of each of the ball screws is selected to achieve a predetermined rate of movement of the intermediate support.

Accordingly, by selecting the ratio between the lead of the long ball screw and the lead of each of the ball screws to the proper rate, as well as the long ball screw is rotated and the moved body is moved in the longitudinal direction of the long ball screw, the moving speed of the intermediate support is increased and reduced in accordance with a more proper rate than the moving speed of the moved body.

In accordance with a sixth aspect of the present invention, as it depends from one aspect among the first aspect to the fifth aspect, there is provided a feeding apparatus of a moved body, in which a transmission ratio of each of the driving and transmitting members is set to 1:1; and a ratio between the lead of the long ball screw and the lead of each of the ball screws is set to 1:½.

Accordingly, by setting the transmission ratio of each of the driving and transmitting members to 1:1 and setting the ratio between the lead of the long ball screw and the lead of each of the ball screws to 1:½, the long ball screw is rotated and the moved body is moved in the longitudinal direction of the long ball screw, and the moving speed of the intermediate support is reduced at a half of the moving speed of the moved body.

BRIEF DESCRIPTION OF THE ACCOMPANYING DRAWINGS

The above and further objects and novel features of the present invention will more fully appear from the following detailed description when the same is read in conjunction with the accompanying drawings, in which.

DESCRIPTION OF THE PREFERRED EMBODIMENTS

A description will be given below of an embodiment of a feeding apparatus of a moved body in accordance with the present invention with reference to the accompanying drawings.

Figure 6:
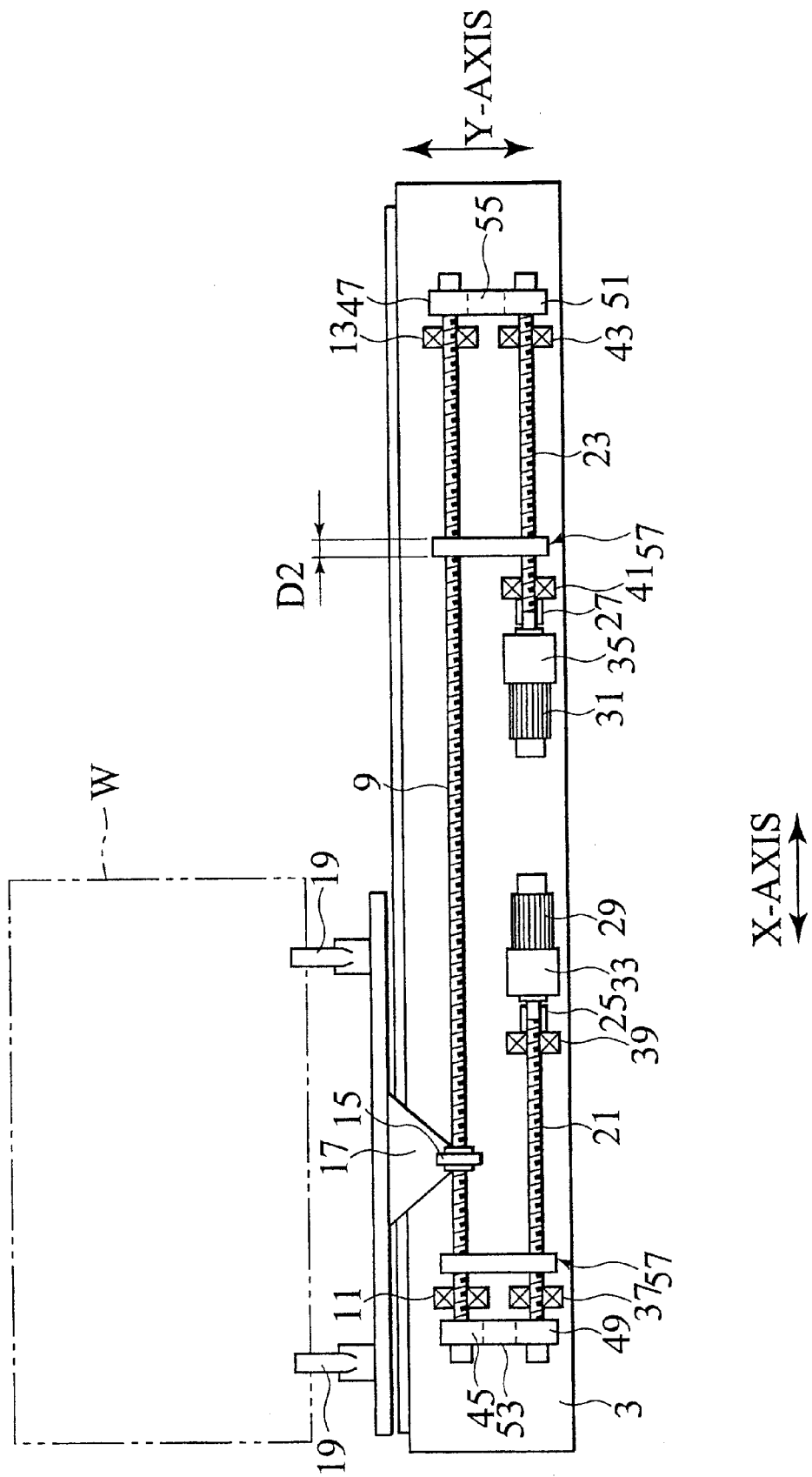
FIG. 6 is a plan view of a feeding apparatus in accordance with the present invention.
Figure 7:
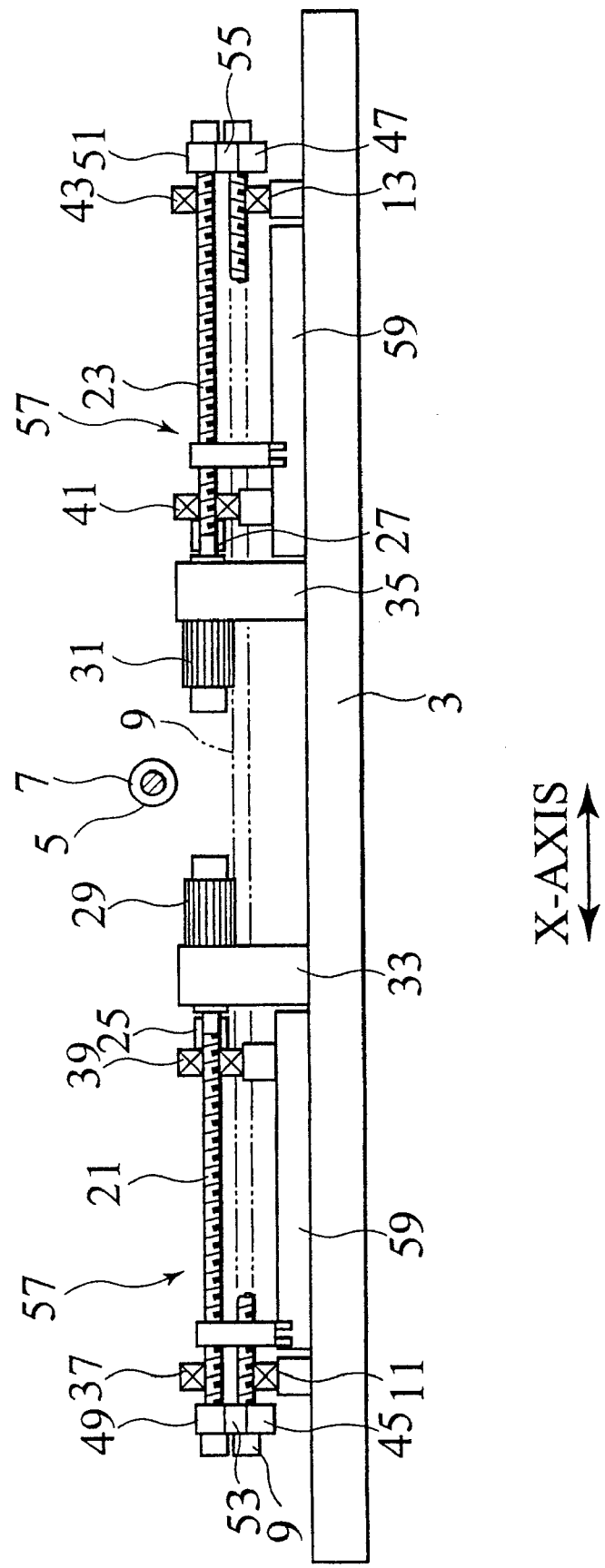
FIG. 7 is a front elevational view in FIG. 6.
Figure 8:
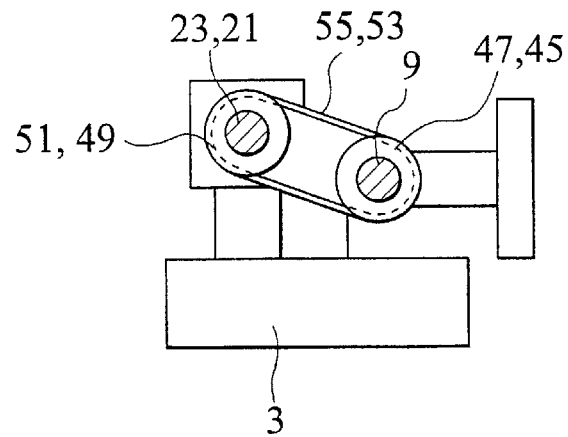
FIG. 8 is a side elevational view in FIG. 6.

With reference to FIGS. 6, 7 and 8, for example, in a turret punch press corresponding to a sheet material working machine, a feeding apparatus 1 corresponding to a moved body for moving a workpiece W is structured such that a carriage base 3 corresponding to an embodiment of a base extending in a lateral direction in FIGS. 6 and 7 is provided in such a manner as to move in a direction of a Y-axis (a vertical direction in FIG. 6). A nut member 5 is provided in an upper portion in a substantially center portion of the carriage base 3, and a rotatable ball screw 7 extending in the direction of the Y-axis is provided in the nut member 5. One lower end of the ball screw 7 is supported to a bearing (not shown), and another upper end of the ball screw 7 is connected to an output shaft of a Y-axis servo motor mounted to a motor base (not shown).

In the structure mentioned above, when driving the Y-axis servo motor (not shown), the ball screw 7 is rotated and the carriage base 3 is moved in the direction of the Y-axis via the nut member 5.

Further, a rotatable long ball screw 9 is extended along a direction of an X-axis of the carriage base 3, and both ends of the long ball screw 9, for example, right and left ends in FIG. 6, are rotatably supported by bearings 11 and 13. A nut member 15 is engaged with the long ball screw 9, and a carriage 17 is integrally provided in the nut member 15. A plurality of work clamps 19 for clamping a workpiece W corresponding to an example of the moved body are provided in the carriage 17.

Ball screws 21 and 23 respectively extending in left and right directions from a substantially center portion in the longitudinal direction of the long ball screw 9 are provided in parallel to the long ball screw 9. X-axis servo motors 29 and 31 corresponding to an embodiment of a drive motor are connected to inner ends of the ball screws 21 and 23, that is, in a substantially center portion side in a longitudinal direction of the long ball screw 9 by couplings 25 and 27, respectively. The X-axis servo motors 29 and 31 are mounted to motor bases 33 and 35 provided on the carriage base 3. Both ends of the ball screws 21 and 23 are rotatably supported by bearings 37 and 39; 41 and 43, respectively.

Pulleys 45 and 47 corresponding to an embodiment of a driving and transmitting member are attached to both ends of the long ball screw 9, and pulleys 49 and 51 corresponding to an embodiment of a driving and transmitting member are attached to a left end and a right end of the ball screws 21 and 23. Timing belts 53 and 55 are respectively wound between the pulleys 45 and 49 and between the pulleys 47 and 51.

In accordance with the structure mentioned above, when driving the X-axis servo motors 29 and 31, the ball screws 21 and 23 are rotated. When the ball screws 21 and 23 are rotated, the long ball screw 9 is rotated via the pulley 49, the timing belt 53 and the pulley 45; and the pulley 51, the timing belt 55 and the pulley 47. Sine the long ball screw 9 is rotated, whereby the carriage 17 is moved in the direction of the X-axis via the nut member 15, the workpiece W clamped by the work clamp 19 is moved in the direction of the X-axis. Accordingly, the workpiece W is moved in the direction of the X-axis and the direction of the Y-axis.

Figure 9:
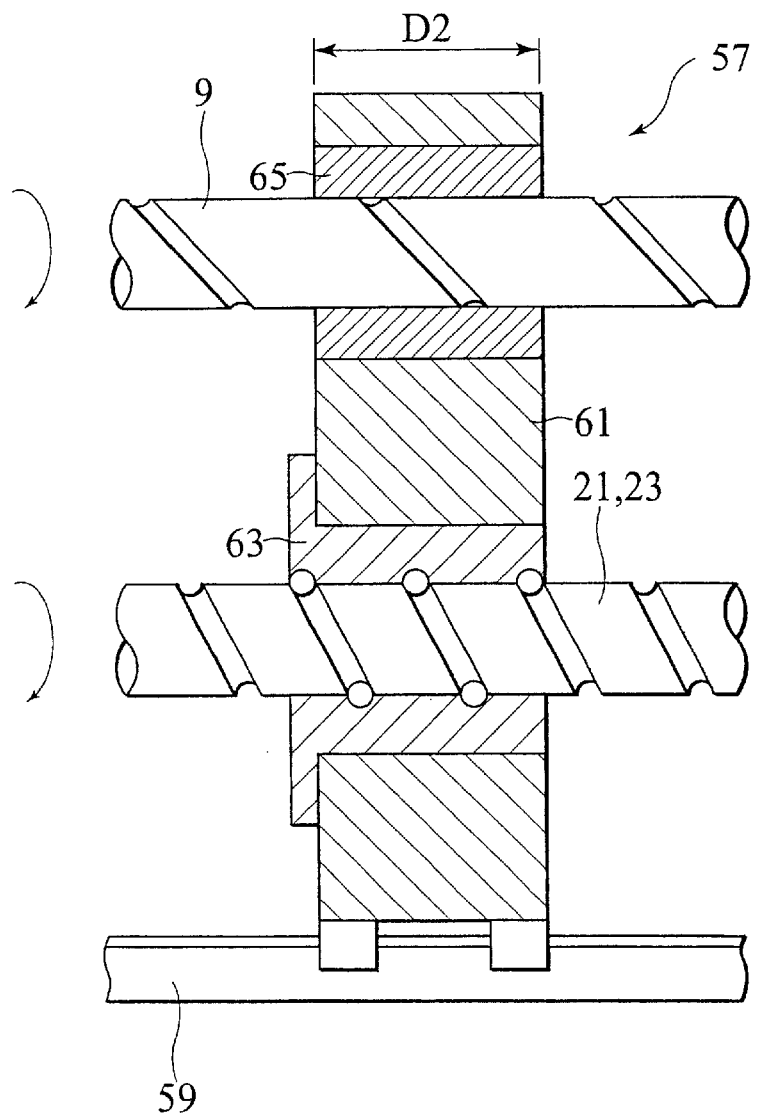
FIG. 9 is an enlarged front elevational cross sectional view of an intermediate support.

An intermediate support 57 is attached to each of the long ball screw 9 and the ball screws 21 and 23. Each of the intermediate supports 57 are provided on the carriage base 3 as shown in FIG. 7 and is structured such as to be moved in a lateral direction by being guided by each of linear guides 59 extending in a lateral direction. A detailed structure of the intermediate support 57 is, for example, well illustrated in FIG. 9. In FIG. 9, the intermediate support 57 is guided by the linear guide 59 and is provided with an intermediate support main body 61 for supporting the long ball screw 9 and the ball screws 21 and 23. A nut member 63 engaged with the ball screws 21 and 23 and a plain bearing 65 slid in a lateral direction with respect to the long ball screw 9 are provided in the intermediate support main body 61.

In accordance with the structure mentioned above, when the ball screws 21 and 23 are rotated as shown by an arrow in FIG. 9, the intermediate support main body 61 is moved, for example, in a rightward direction in FIG. 9 via the nut member 63, and it is possible to smoothly move the intermediate support main body 61 in the rightward direction in FIG. 9 at a high speed via the plain bearing 65 with respect to the long ball screw 9. Further, when the ball screws 21 and 23 are rotated, the long ball screw 9 is rotated via the pulley 49, the timing belt 53 and the pulley 45; and the pulley 51, the timing belt 55 and the pulley 47. Since the carriage 17 is moved in the direction of the X-axis via the nut member 15 when the long ball screw 9 is rotated, the workpiece W clamped by the work clamp 19 is moved in the direction of the X-axis.

In FIG. 9, when setting a ratio of a diameter between the pulleys 45 and 49 and a ratio of a diameter between the pulleys 47 and 51 to 1:1 and properly selecting a lead ratio between a lead of the ball screws 21 and 23 and a lead of the long ball screw 9, it is possible to self-propel the intermediate support main body 61 on the long ball screw 9 at a necessary speed. For example, when setting the lead of the ball screws 21 and 23 to a half of the lead of the long ball screw 9, it is possible to move the intermediate support main body 61 with respect to the long ball screw 9 at a half speed. Accordingly, it is possible to move each of the intermediate supports 57 at a moving speed corresponding to a half of a moving speed of the carriage 17.

Further, each of the intermediate supports 57 on the long ball screw 9 has only a width D2 of the plain bearing 65, for example, 50 mm or less, so that a conventional nut member, pulley and the like are not required. Accordingly, it is possible to reduce a width at 200 to 250 mm in one side in comparison with the conventional width, for example, 250 to 300 mm and it is possible to minimize the supporting width by each of the intermediate supports 57.

Accordingly, it is possible to effectively use the long ball screw 9 at the degree, and it is unnecessary to lengthen the long ball 9. Therefore, it is possible to reduce a distance between the supports without further lengthening the long ball screw 9. Further, since it is possible to increase a danger speed of the long ball screw 9, it is possible to make a speed of the long ball screw 9 high.

Further, since the X-axis servo motors 29 and 31 are positioned near the ball screw 9 for the Y-axis and the intermediate support 57 is on the ball screws 21 and 23, it is possible to reduce a vibration applied to the long ball screw 9 in the case that a vibration is generated at a time of punching such as in the punch press.

Figure 10:
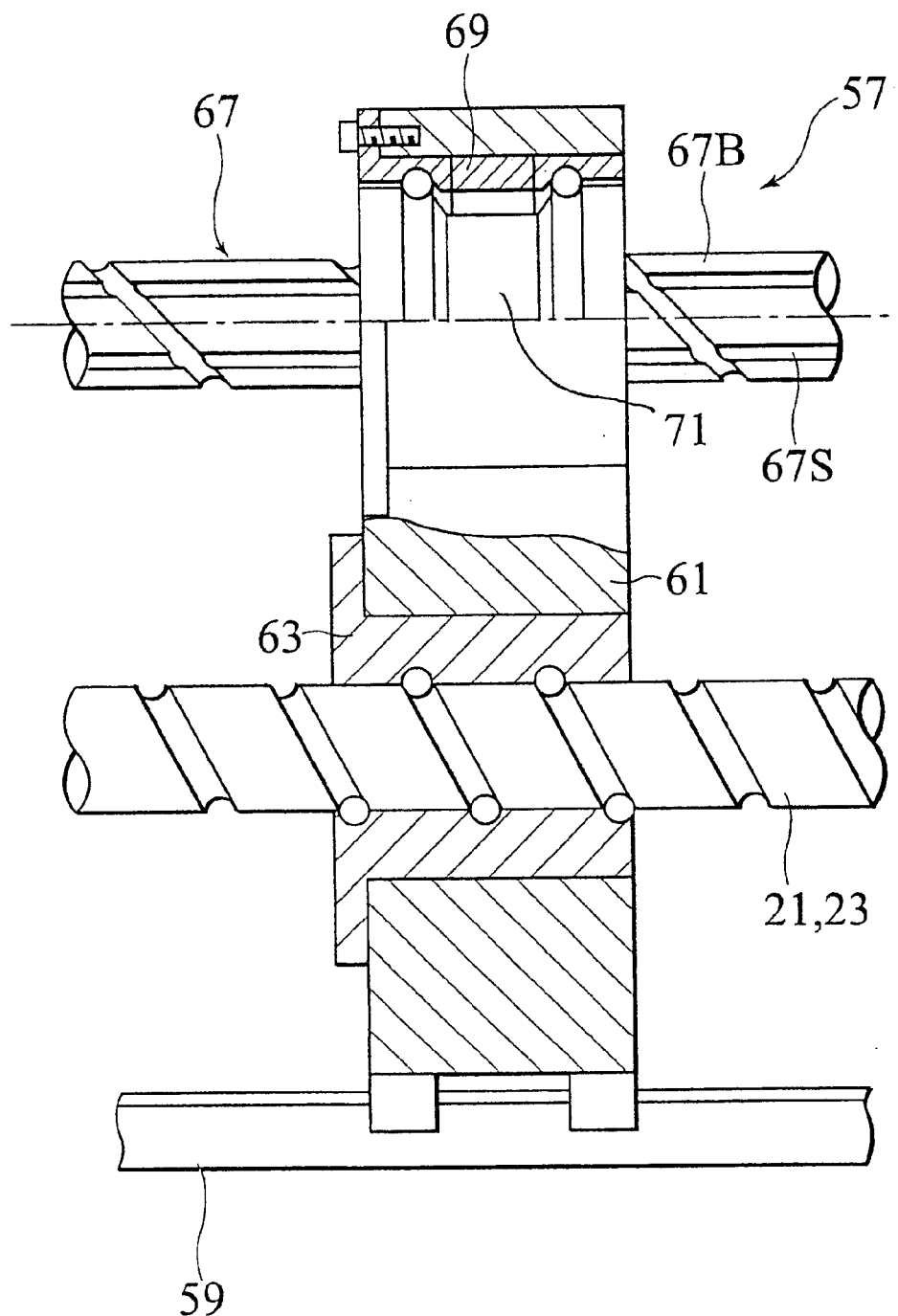
FIG. 10 is an enlarged front elevational cross sectional view of an intermediate support in place of FIG. 9.

FIG. 10 shows the other embodiment in place of FIG. 9. In FIG. 10, the same reference numerals are attached to the same elements as the elements in FIG. 9 and a detailed description will be omitted. In FIG. 10, a long ball screw spline 67 is used in place of the long ball screw 9, and the long ball screw spline 67 is constituted by a spline portion 67S and a ball screw portion 67B. Further, a spline outer cylinder portion 71 is provided within the intermediate support main body 61 via a support bearing 69.

Accordingly, the spline outer cylinder portion 71 is engaged with the spline portion 67S of the long ball screw spline 67.

In accordance with the structure mentioned above, when the ball screws 21 and 23 are rotated, the long ball screw 9 is rotated via the pulley 49, the timing belt 53 and the pulley 45; and the pulley 51, the timing belt 55 and the pulley 47. Since the carriage 17 is moved in the direction of the X-axis via the nut member 15 when the long ball screw 9 is rotated, the workpiece W clamped by the work clamp 19 is moved in the direction of the X-axis.

Figure 1:
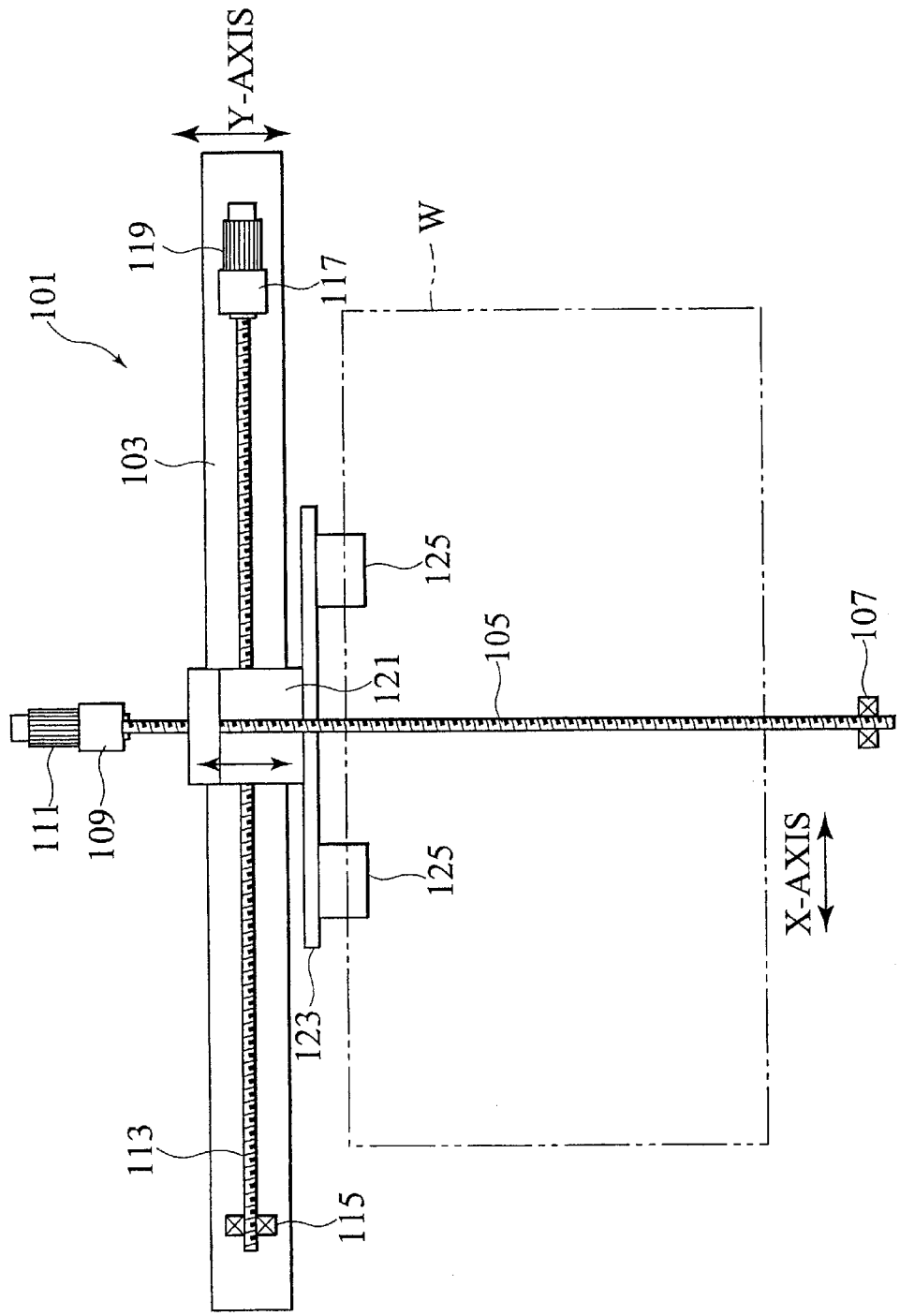
FIG. 1 is a plan view of a conventional feeding apparatus.
Figure 2:
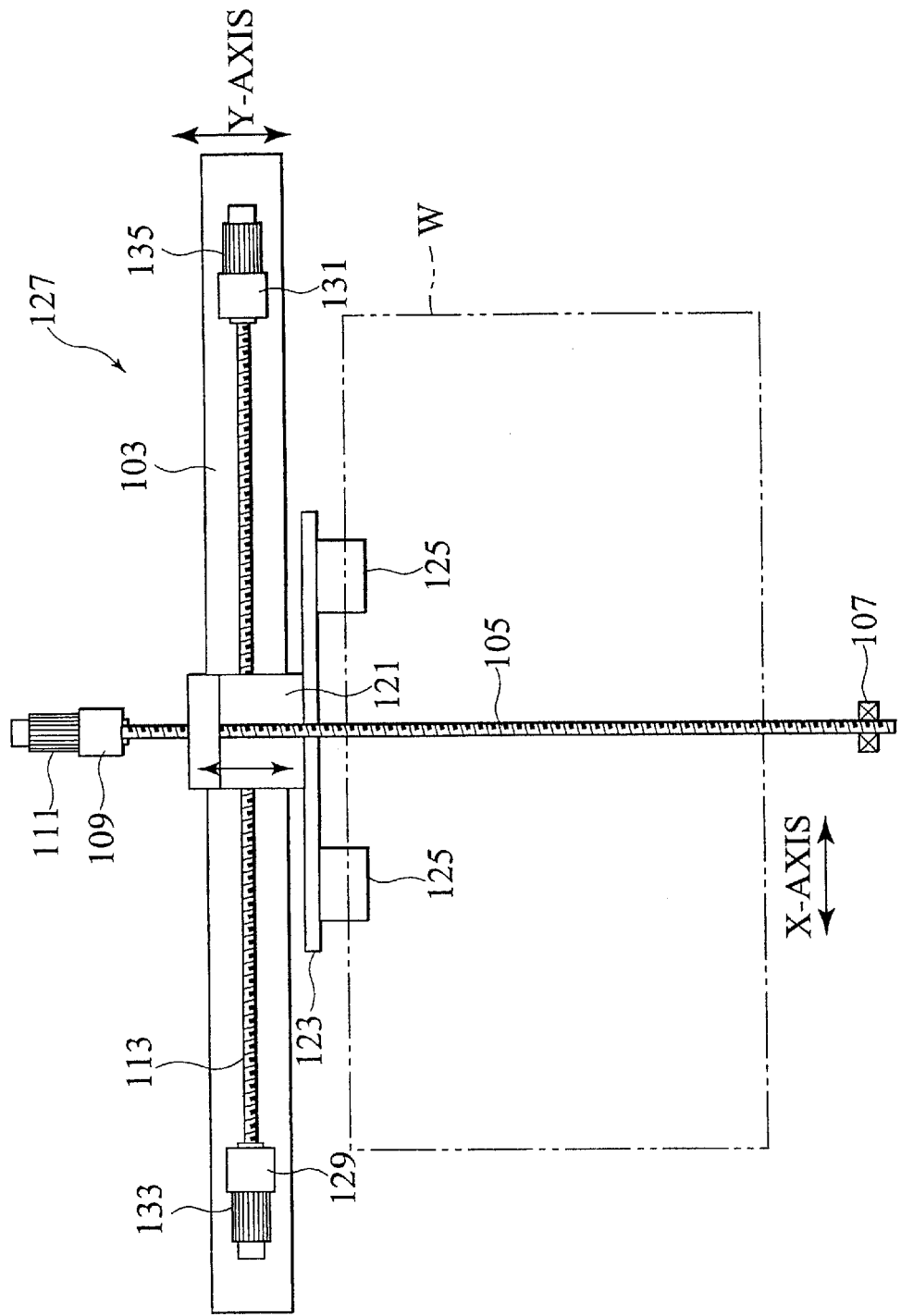
FIG. 2 is a plan view of another conventional feeding apparatus.
Figure 3:
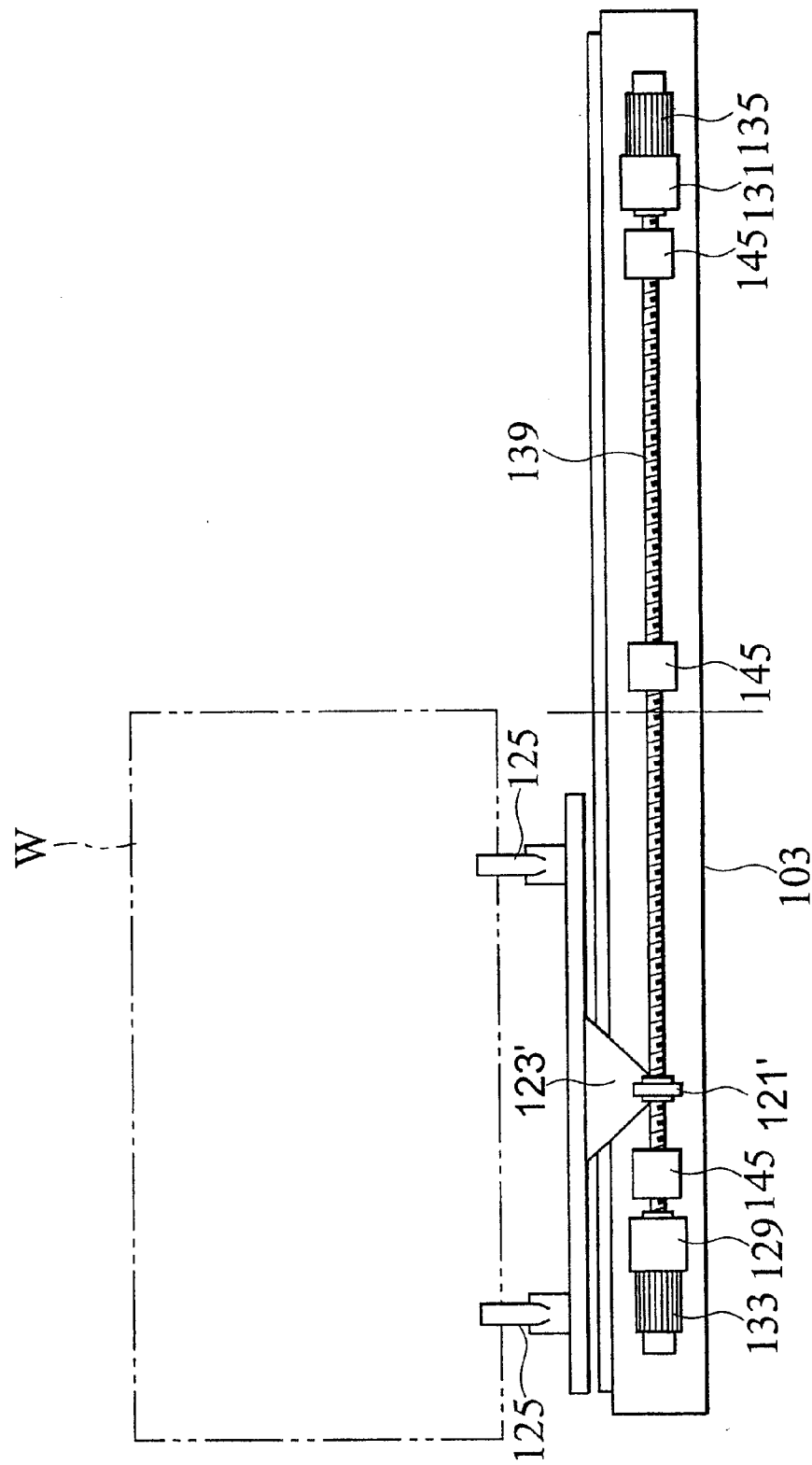
FIG. 3 is a plan view of the other conventional feeding apparatus.
Figure 4:
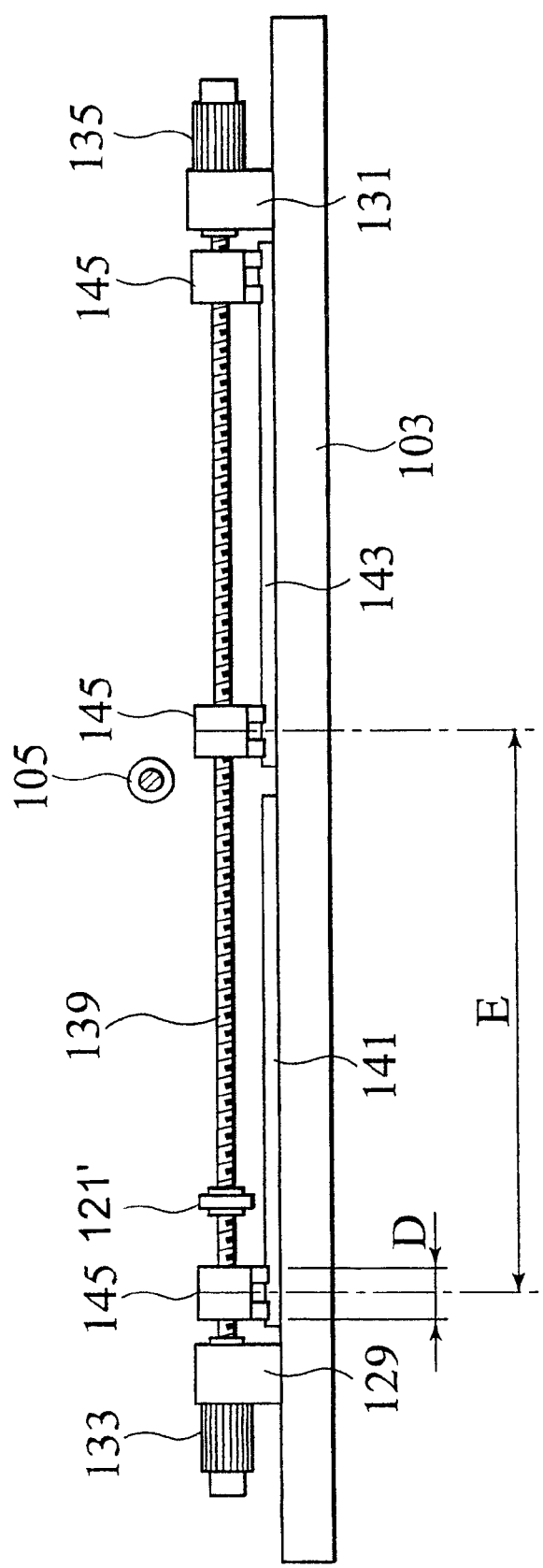
FIG. 4 is a front elevational view in FIG. 3.
Figure 5:
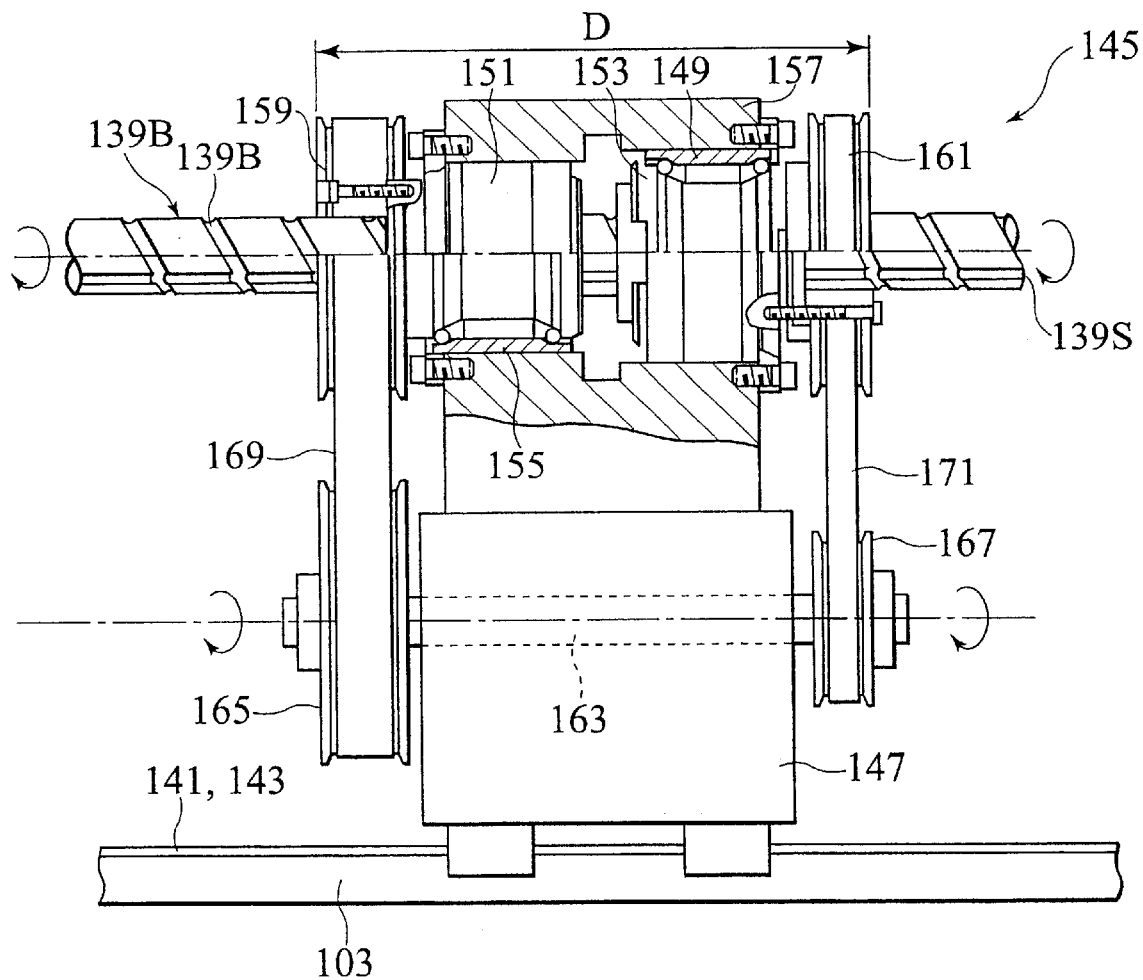
FIG. 5 is an enlarged front elevational cross sectional view of a conventional intermediate support.

In FIG. 5, when the ball screws 21 and 23 are rotated, the intermediate support main body 61 is moved, for example, in a rightward direction in FIG. 10 via the nut member 63. At this time, the spline outer cylinder portion 71 is smoothly moved in the rightward direction with respect to the spline portion 67S. As a result, the same effect as that in FIG. 9 can be obtained.

While preferred embodiments of the present invention have been described using specific terms, such description is for illustrative purpose, and it is to be understood that changes and variations may be made without departing from the spirit or scope of the following claims.

What is claimed is:

1. A feeding apparatus of a moved body, comprising:
   a rotatable long ball screw extending in a first longitudinal direction;
   a pair of drive shafts, each comprising inner and outer end portions and arranged in parallel to the long ball screw, the drive shafts each provided with a ball screw;
   driving and transmitting members connecting outer end portions of each of the drive shafts and respective ends of the long ball screw;
   two drive motors connected to the inner end portions of each of the drive shafts; and
   intermediate supports supporting the long ball screw and each of the drive shafts respectively, the intermediate supports being moved in the longitudinal direction of the drive shafts and each of the drive shafts by rotation of the long ball screw.

2. The feeding apparatus of a moved body of claim 1, wherein the long ball screw (comprises) a spline on an outer periphery, the spline extending in the first direction.

3. The feeding apparatus of a moved body of claim 2, wherein the intermediate supports comprises a spline outer cylinder engaged with the spline of the long ball screw.

4. The feeding apparatus of a moved body of claim 1, wherein a plain bearing that is slidable with respect to the long ball screw is provided in the intermediate support.

5. The feeding apparatus of a moved body of claim 1, wherein a ratio between a lead of the long ball screw and a lead of each of the ball screws, determines a speed of movement of the intermediate support relative to the long ball screw.

6. The feeding apparatus of a moved body of claim 1, wherein a lead of the long ball screw is different from a lead of each of the ball screws.

7. The feeding apparatus of a moved body of claim 1, further comprising a plurality of linear guides that guide the movement of the intermediate supports.

8. The feeding apparatus of a moved body of claim 1, further comprising a base.

9. The feeding apparatus of a moved body of claim 8, wherein the two drive motors are mounted to a pair of motor bases respectively, the motor bases provided on the base.

10. The feeding apparatus of a moved body of claim 8, further comprising bearings provided on each of two ends of the base, the bearings supporting the long ball screw.

11. The feeding apparatus of a moved body of claim 1, further comprising a nut member engaged with the long ball screw and a moved body mounted to the nut member.

12. The feeding apparatus of a moved body of claim 11, wherein the moved body is a carriage provided with a work clamp for clamping a workpiece.

13. The feeding apparatus of a moved body of claim 1, wherein each intermediate support is provided with a nut member engaged with the ball screw of the respective drive shaft supported by the intermediate support.

14. A feeding apparatus of a moved body, comprising:
   a base;
   bearings provided at two ends of the base;
   a rotatable long ball screw supported by the bearings and extending in a longitudinal direction of the base;
   a first nut member engaged with the long ball screw;
   a moved body mounted to the first nut member;
   a pair of drive shafts, each comprising inner and outer end portions and arranged in parallel to the long ball screw, the drive shafts each provided with a ball screw;

driving and transmitting members connecting outer end portions of each of the drive shafts and two respective ends of the long ball screw;

two drive motors mounted on the base, each of the drive motors being connected to the inner end portions of each of the drive shafts; and intermediate supports supporting the long ball screw and each of the drive shafts respectively, each intermediate support being provided with a second nut member which is engaged with the ball screw of the respective drive shaft supported by the intermediate support, the intermediate supports being moved in the longitudinal direction of the long ball screw and each of the drive shafts by rotation of the drive shafts.

15. A feeding apparatus of a moved body according to claim 14, wherein the moved body is a carriage provided with a work clamp for clamping a workpiece.

16. A feeding apparatus of a moved body according to claim 15, wherein a plain bearing that is slidable with respect to the long ball screw is provided in the intermediate support.

17. A feeding apparatus of a moved body according to claim 16, wherein the long ball screw is provided with a spline on an outer periphery in the longitudinal direction of the long ball screw; and the intermediate support is provided with a spline outer cylinder engaged with the spline provided in the long ball screw.

18. A feeding apparatus of a moved body according to claim 17, wherein a ratio between a lead of the long ball screw and a lead of each of the ball screws is selected to a achieve a predetermined rate of movement of the intermediate support.

19. A feeding apparatus of a moved body according to claim 18, wherein a transmission ratio of each of the driving and transmitting members is set to 1:1; and the ratio between the lead of the long ball screw and the lead of each of the ball screws is set to 1:½.

* * * * *

UNITED STATES PATENT AND TRADEMARK OFFICE
CERTIFICATE OF CORRECTION

PATENT NO.    : 6,490,956 B1
DATED         : December 10, 2002
INVENTOR(S)   : H. Takeishi et al.

It is certified that error appears in the above-identified patent and that said Letters Patent is hereby corrected as shown below:

<u>Column 10,</u>
Line 12, after "to" delete "a" (first occurrence).
Line 20, "(comprises)" should be -- comprises --.

Signed and Sealed this

Second Day of September, 2003

JAMES E. ROGAN
*Director of the United States Patent and Trademark Office*